(12) United States Patent
Grein et al.

(10) Patent No.: US 9,255,166 B2
(45) Date of Patent: *Feb. 9, 2016

(54) HIGH PURITY HETEROPHASIC PROPYLENE COPOLYMERS

(75) Inventors: Christelle Grein, Linz (AT); Klaus Bernreitner, Linz (AT); Torvald Vestberg, Porvoo (FI)

(73) Assignee: Borealis AG, Vienna (AU)

( * ) Notice: Subject to any disclaimer, the term of this patent is extended or adjusted under 35 U.S.C. 154(b) by 452 days.

This patent is subject to a terminal disclaimer.

(21) Appl. No.: 12/736,586

(22) PCT Filed: Dec. 18, 2008

(86) PCT No.: PCT/EP2008/067858
§ 371 (c)(1),
(2), (4) Date: Oct. 21, 2010

(87) PCT Pub. No.: WO2009/129873
PCT Pub. Date: Oct. 29, 2009

(65) Prior Publication Data
US 2011/0034634 A1 Feb. 10, 2011

(30) Foreign Application Priority Data
Apr. 24, 2008 (EP) .................... 08103707

(51) Int. Cl.
| *C08L 23/00* | (2006.01) |
| *C08F 210/06* | (2006.01) |
| *C08L 23/10* | (2006.01) |
| *C08L 23/12* | (2006.01) |
| *C08F 210/16* | (2006.01) |
| *C08L 23/16* | (2006.01) |

(52) U.S. Cl.
CPC .............. *C08F 210/06* (2013.01); *C08L 23/10* (2013.01); *C08L 23/12* (2013.01); *C08F 210/16* (2013.01); *C08L 23/16* (2013.01); *C08L 2207/02* (2013.01)

(58) Field of Classification Search
CPC ........ C08F 210/06; C08L 23/10; C08L 23/12
USPC ....................................... 525/240
See application file for complete search history.

(56) References Cited

U.S. PATENT DOCUMENTS

| 6,410,663 | B2 | 6/2002 | Shamshoum et al. | |
| 6,437,063 | B1 * | 8/2002 | Karbasi et al. ............... | 526/128 |
| 7,238,758 | B2 * | 7/2007 | Yoshikiyo et al. ............. | 526/128 |
| 8,822,021 | B2 * | 9/2014 | Grein et al. ................. | 428/220 |
| 2005/0032991 | A1 | 2/2005 | Chosa et al. | |
| 2006/0217501 | A1 | 9/2006 | Migone et al. | |
| 2007/0117932 | A1 * | 5/2007 | De Palo et al. .............. | 525/240 |

FOREIGN PATENT DOCUMENTS

| CN | 1675255 A | 9/2005 |
| EP | 0 491 566 | 6/1992 |
| EP | 0 887 379 | 12/1998 |
| EP | 1002814 A1 | 5/2000 |
| EP | 0877039 B1 | 10/2001 |
| EP | 0854156 B1 | 11/2001 |
| EP | 1 236 769 | 9/2002 |
| EP | 1 364 760 | 11/2003 |
| EP | 1244717 B1 | 1/2004 |
| EP | 0916701 B1 | 2/2004 |
| EP | 1042401 B1 | 2/2005 |
| EP | 1373403 B1 | 4/2005 |
| EP | 1 535 718 | 6/2005 |
| EP | 1 538 167 | 6/2005 |
| EP | 1354901 B1 | 3/2006 |
| EP | 1 717 269 | 11/2006 |
| EP | 1 783 145 | 5/2007 |
| EP | 1783145 | * 5/2007 |
| JP | 03 068613 | 3/1991 |
| JP | 04 015241 | 1/1992 |
| JP | 20060096936 A | 10/2007 |
| WO | WO 87/07620 | 12/1987 |
| WO | WO 92/12182 | 7/1992 |
| WO | WO 92/19653 | 11/1992 |
| WO | WO 92/19658 | 11/1992 |
| WO | WO 99/24478 | 5/1999 |
| WO | WO 00/68315 | 11/2000 |
| WO | WO 2004/000899 | 12/2003 |
| WO | 2004011507 A1 | 2/2004 |
| WO | WO 2004/111095 | 12/2004 |
| WO | 20060114358 A2 | 11/2006 |

OTHER PUBLICATIONS

Database WPI Week 199209; Thomson Scientific; London, Great Britain; 1992-069948; XP002498084; 2 pages.
Soga, K. & Terano, M., Ed. "Catalyst Design for Tailor-Made Polyolefins—Proceedings of the International Symposium on Catalyst Design for Tailor-Made Polyolefins, Kanazawa, Mar. 10-12, 1994," Studies in Surface Science & Catalysis, vol. 89, 1994, pp. 153-161.

* cited by examiner

*Primary Examiner* — Irina Krylova
(74) *Attorney, Agent, or Firm* — Warn Partners, P.C.

(57) ABSTRACT

High purity heterophasic polypropylene copolymers comprising (A) 73 to 98 wt % of a propylene homo- or copolymer matrix with an $MFR_2$ in accordance with ISO 1133 (230° C., 2.16 kg load) of ≥45 g/10 min and (B) 2 to 27 wt % of an elastomeric copolymer, comprising propylene in an amount of at least 50 wt % of component (B) and at least ethylene and/or one other $C_4$ to $C_{10}$ alpha olefin in an amount of up to 50 wt % of component (B), the heterophasic polypropylene copolymers being obtainable by a multistage polymerization process in the presence of a catalyst system comprising (i) a Ziegler-Natta procatalyst which contains a trans-esterification product of a lower alcohol and a phthalic ester and (ii) optionally an organometallic cocatalyst and (iii) an external donor represented by formula (I) $Si(OCH_2CH_3)_3(NR^1R^2)$ wherein $R^1$ and $R^2$ can be the same or different a represent a hydrocarbon group having 1 to 12 carbon atoms, their production and use.

9 Claims, No Drawings

HIGH PURITY HETEROPHASIC PROPYLENE COPOLYMERS

This application is a National Stage of International Application No. PCT/EP2008/067858, filed Dec. 18, 2008. This application claims priority to European Patent Application No. 08103707.9 filed on Apr. 24, 2008. The disclosures of the above applications are incorporated herein by reference.

The present invention relates to heterophasic polypropylene copolymers with high purity, which is shown in reduced volatiles content, reduced fogging and a reduced hexane-solubles content. Furthermore, the present invention relates to a process for the production of such copolymers as well as to their use.

Heterophasic propylene copolymers are well established in a lot of applications, such as moulding applications, films, wires and cables or pipes, because of their good stiffness/impact ratio together with good flowability. For example heterophasic polymers are used for the production of car exteriors and interiors, in particular dashboards, door claddings, consoles, trims and the like as well as in the packaging area for food and medicals.

Heterophasic polymers are polymers having a matrix phase and a disperse phase. The matrix phase is usually a propylene homopolymer or copolymer phase and the disperse phase is often a propylene copolymer comprising ethylene and/or other higher α-olefin(s). Their preparation using different catalyst systems has been described in several patents and patent applications.

EP 1 538 167, for example, describes a method for polymerizing an olefin using a catalyst system which comprises the following components (A), (B) and (C):
Component (A): a solid component (i) containing magnesium, titanium, halogen and an internal donor,
Component (B): an organometallic compound and
Component (C): an organosilicon compound represented by the formula

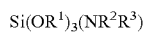

wherein $R^1$ is a hydrocarbon group having 1 to 6 carbon atoms, $R^2$ is a hydrocarbon group having 1 to 12 carbon atoms or hydrogen atom, and $R^3$ is a hydrocarbon group having 1 to 12 carbon atoms.

Component (A) may be prepared for example by co-grinding a magnesium compound, an electron donor and a titanium halide compound, or by dispersing and dissolving them in a solvent to allow them to contact each other. A further method mentioned comprises dissolving a magnesium compound and an electron donor in a solvent and adding a titanium halide compound to the resulting solution to precipitate a solid catalyst.

According to EP 1 538 167 this catalyst system allows production of an alpha-olefin polymer, like heterophasic polypropylene copolymers, with high hydrogen response, high polymerization rate, high stereoregularity and good melt fluidity. The polymers produced can provide excellent performance to automobile and household electric structural materials.

EP 1 783 145 discloses a method for polymerizing an olefin using a catalyst system which comprises the following components (A), (B) and (C):
Component (A): a prepolymer obtained by olefin prepolymerisation on solid titanium catalyst component (A'), prepared by contacting a solid component (i) containing magnesium, titanium, halogen and an donor ($c_3$), a polar compound (II) having a dipole moment of 0.5 to 4.0 Debye, and at least one compound (iii) selected from liquid titanium (d) and an electron donor (e)
Component (B): an organometallic compound and
Component (C): an organosilicon compound represented by the formula

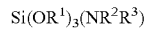

wherein $R^1$ is a hydrocarbon group having 1 to 8 carbon atoms, $R^2$ is a hydrocarbon group having 1 to 12 carbon atoms or hydrogen atom, and $R^3$ is a hydrocarbon group having 1 to 12 carbon atoms.

The propylene copolymer compositions, for example heterophasic polypropylene copolymer, obtained according to EP 1 783 145 can be processed into a desired moulded article such as for automotives. The only advantage mentioned in EP 1 783 145 is that olefinic polymers having high fluidity as well as high stereoregularity even without excessive use of hydrogen molecule as chain transfer agent can be effectively manufactured.

No further advantageous properties of the obtained polymer compositions are mentioned. The disadvantage of this catalyst system is especially the complex preparation of the solid titanium catalyst component (A').

None of these literatures mentions the production of heterophasic polypropylene copolymers useful for a great variety of applications, such as for the production of moulded articles, which show improved high purity, respectively a reduced volatiles content, reduced fogging and a reduced hexane-solubles content compared to products known from the prior art.

The trend in industry is towards polymer materials with higher melt flow rates (MFR). Higher MFR means better processability of the polymer material, i.e. due to good flowability. Thus faster throughput of the process lines for producing end application articles from the polymer, and therefore cost savings, can be achieved.

But as it is well known in the art a higher MFR means a higher content of the low molecular weight (LMW) component of the polymer. The LMW tail of the polymer composition comprises i.a. oligomers. Accordingly also the oligomer content in polymer compositions increases with increasing MFR. The oligomers thus belong to a generally known group of compounds, namely volatiles. Such volatiles contribute also to the so called "fogging" problem, i.e. these compounds tend to separate, e.g. evaporate, from the polymer material and cause fogging on the surrounding surfaces e.g. on car windows.

Therefore polymers with high MFR, but still low oligomer content are becoming increasingly important.

Unfortunately polypropylene having a high MFR (>50 g/10 min), respectively low molecular weight, is an intrinsically very brittle material. In order to improve its toughness it is known to add high amounts of impact modifier. This in turn has an adverse effect on flow, stiffness and hexane extractables (hexane-solubles).

Impact/stiffness balance along with compliancy to food regulations in terms of hexane-solubles (standard issued by the food drug administration (FDA): hexane solubles <5.6 wt % for food contact and <2.6 wt % according to the cooking paragraph) is a must in advanced packaging applications.

Furthermore hexane-solubles are also undesirable in the field of medical packaging.

In automotive applications, for example, key issues are low emissions as well as low amounts of volatile organic compounds (VOC) and fogging. Those VOCs are supposed to be produced during the extrusion or compounding step. Reducing emissions from the polymeric material applied in automobile interior is a general target for several years. This target has been pursued until now by applying purification steps in the production of the respective polymeric material (e.g. steam stripping, vacuum degassing and low input compounding) or by using special additives (e.g. high performance stabilizers and absorbers). Examples for such processes are disclosed in EP 1 364 760 A1 and EP 1 535 718 A1. These processes involve, however, increased investment cost and reduced output rates, deteriorating the economic situation of the resulting products.

For these reasons, although much development work has been done in the field of heterophasic polypropylene copolymers there is a continuous need for alternative or improved heterophasic polypropylene copolymers, which fulfil the increasing environmental and customer requirements in many end application areas of polymer materials, such as packaging, including food and medical packaging, fibre, pipe and automobile industry.

These heterophasic polypropylene copolymers shall show desirable properties, such as improved high purity, respectively reduced volatiles content, reduced fogging and a reduced hexane-solubles content, while keeping the other properties needed for the production of moulded articles, like good stiffness/impact ratio together with good flowability. These properties shall be achieved without the need of any further treatment of the polymers for reducing the content of volatiles, hexane-solubles and fogging.

It was therefore an object of the invention to provide heterophasic polypropylene copolymers, which show improved high purity.

The present invention resides in the finding that high purity heterophasic polypropylene copolymers are obtainable by a multi-step polymerization procedure in the presence of a special Ziegler-Natta procatalyst which contains a trans-esterification product of a lower alcohol and a phthalic ester in combination with a special external donor.

Thus in a first aspect, the present invention is therefore directed to high purity heterophasic polypropylene copolymers comprising
(A) 73 to 98 wt % of a propylene homo- or copolymer matrix with an $MFR_2$ in accordance with ISO 1133 (230° C., 2.16 kg load) of ≥45 g/10 min and
(B) 2 to 27 wt % of an elastomeric copolymer, comprising propylene in an amount of at least 50 wt % of component (B) and at least ethylene and/or one other $C_4$ to $C_{10}$ alpha olefin in an amount of up to 50 wt % of component (B), the heterophasic polypropylene copolymers being obtainable by a multistage polymerization process in the presence of a catalyst system comprising
(i) a Ziegler-Natta procatalyst which contains a trans-esterification product of a lower alcohol and a phthalic ester and
(ii) optionally an organometallic cocatalyst and
(iii) external donor represented by formula (I)

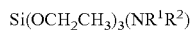

$Si(OCH_2CH_3)_3(NR^1R^2)$ wherein $R^1$ and $R^2$ can be the same or different a represent a hydrocarbon group having 1 to 12 carbon atoms.

It has surprisingly be found that such heterophasic polypropylene copolymers show low levels of emissions and volatiles, which can be seen in low emission and low amounts of VOC and fogging of the granulated compounds and the injection moulded articles made from those compounds. At the same time the good impact properties especially at low temperatures are achieved whereas the flexural properties are not affected. In addition the heterophasic polypropylene copolymers show low levels of hexane-solubles.

The propylene matrix (A) can be a propylene homopolymer, a propylene copolymer or mixtures thereof, like a homo/random copolymer. However it is preferred that the propylene matrix (A) is a propylene homopolymer.

If the propylene matrix (A) is a propylene homopolymer, the matrix may consist of a single propylene homopolymer, but may also comprise a mixture of different propylene homopolymers.

The expression homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable. The comonomer content can be determined with FT infrared spectroscopy, as described below in the examples.

Where the propylene matrix (A) comprises a propylene copolymer or is a homo/random propylene copolymer, the propylene copolymer comprises monomers copolymerizable with propylene, for example comonomers such as ethylene and $C_4$ to $C_{20}$ alpha-olefins, in particular ethylene and $C_4$ to $C_{10}$ alpha-olefins, e.g. 1-butene or 1-hexene. The comonomer content in the propylene matrix is in such a case preferably relatively low, i.e. up to 6.0 wt %, more preferably 1.0 to 6.0 wt %, still more preferably 1.0 to 4.0 wt %, yet more preferably 1.0 to 3.0 wt %.

The propylene matrix (A) can be unimodal or multimodal, like bimodal. However it is preferred that the propylene matrix (A) is unimodal. Concerning the definition of unimodal and multimodal, like bimodal, it is referred to the definition below.

When the matrix is unimodal with respect to the molecular weight distribution, it may be prepared in a single stage process e.g. as slurry or gas phase process in a slurry or gas phase reactor. Preferably, the unimodal matrix is polymerized as a slurry polymerization. Alternatively, the unimodal matrix may be produced in a multistage process using at each stage process conditions which result in similar polymer properties.

Where the propylene matrix (A) comprises two or more different propylene polymers these may be polymers with different monomer make up and/or with different molecular weight distributions. These components may have identical or differing monomer compositions and tacticities.

Moreover it is preferred that the polymer matrix (A) has a rather high melt flow rate (MFR), i.e. a rather low molecular weight.

The melt flow rate measured under a load of 2.16 kg at 230° C. (ISO 1133) is denoted as $MFR_2$ (230° C.). Accordingly, it is preferred that in the present invention the propylene matrix (A) has an $MFR_2$ (230° C.) equal to or above 45 g/10 min. Preferably the propylene matrix (A) has an $MFR_2$ (230° C.) equal to or above 50 g/10 min, more preferably equal to or above 55 g/10 min. The $MFR_2$ (230° C.) can be up to 500 g/10 min.

As a further requirement of the heterophasic propylene copolymer the elastomeric copolymer must fulfill some properties so that the desired results can be achieved.

Accordingly the elastomeric copolymer (B) must comprise propylene and at least ethylene and/or one other $C_4$ to $C_{10}$ alpha-olefin. Preferably the elastomeric copolymer (B) comprises, preferably consists of, propylene and at least one alpha-olefin comonomer selected from the group consisting of ethylene, 1-butene, 1-pentene, 1-hexene, 1-heptene and 1-octene. Preferably the elastomeric copolymer (B) comprises at least propylene and ethylene and may comprise a further alpha-olefin as defined in this paragraph. However it is in particular preferred that the elastomeric copolymer (B) comprises, more preferably consists of, propylene and ethylene as the only polymerizable units. Thus an ethylene-propylene rubber (EPR) as elastomeric copolymer (B) is most preferred.

Like the propylene matrix (A) the elastomeric copolymer (B) can be unimodal or multimodal, like bimodal. However it is preferred that the elastomeric copolymer (B) is unimodal. Concerning the definition of unimodal and multimodal, like bimodal, it is referred to the definition below.

The elastomeric copolymer (B) is in particular featured by an amount of other $C_2$ to $C_{10}$ alpha-olefin than propylene lower than 50 wt %. Accordingly the amount of the other $C_2$ to $C_{10}$ alpha-olefin(s), i.e. excluding propylene, in the elastomeric copolymer (B) is up to 50 wt %, more preferably up to 40 wt %. Preferred ranges for the other $C_2$ to $C_{10}$ alpha-olefin (s), i.e. excluding propylene, in the elastomeric copolymer (B) is 20 to 50 wt %, preferably 20 to 40 wt %. Preferably the elastomeric copolymer (B) is an ethylene-propylene rubber (EPR), in particular with propylene and/or ethylene content as defined in this paragraph.

It is preferred that the heterophasic propylene copolymer comprises
(a) 73 wt % to 98 wt %, more preferably 80 wt % to 95 wt % of the propylene matrix (A) based on the total amount of the heterophasic propylene copolymer and
(b) 2 to 27 wt %, more preferably 5 to 20 wt % of the elastomeric copolymer (B) based on the total amount of the heterophasic propylene copolymer.

Moreover it is appreciated that the MFR (230° C.) of the heterophasic propylene copolymer is rather high, i.e. above 35 g/10 min, more preferably above 40 g/10 min.

The expressions "multimodal" or "bimodal" or "unimodal" used herein refers to the modality of the polymer, i.e. the form of its molecular weight distribution curve, which is the graph of the molecular weight fraction as a function of its molecular weight. As will be explained below, the polymer components of the present invention are produced in a sequential step process, using reactors in serial configuration and operating at different reaction conditions. As a consequence, each fraction prepared in a specific reactor will have its own molecular weight distribution. When the molecular weight distribution curves from these fractions are superimposed to obtain the molecular weight distribution of the final polymer, that curve may show two or more maxima or at least be distinctly broadened when compared with curves for the individual fractions.

According to the present invention the heterophasic propylene copolymer discussed above is produced in a multistage process, wherein the propylene matrix (A) is produced at least in one slurry reactor and subsequently the elastomeric copolymer (B) is produced at least in one gas phase reactor.

Thus, the polymerization system can comprise one or more conventional stirred slurry reactors and/or one or more gas phase reactors. Preferably the reactors used are selected from the group of loop and gas phase reactors and, in particular, the process employs at least one loop reactor and at least one gas phase reactor. It is also possible to use several reactors of each type, e.g. one loop and two or three gas phase reactors, or two loops and one or two gas phase reactors, in series.

Preferably the process comprises also a prepolymerization with the chosen catalyst system, as described in detail below, comprising the special Ziegler-Natta procatalyst, the external donor and optionally the cocatalyst.

In a preferred embodiment, the prepolymerisation is conducted as bulk slurry polymerisation in liquid propylene, i.e. the liquid phase mainly comprises propylene, with minor amount of other reactants and optionally inert components dissolved therein.

The prepolymerisation reaction is typically conducted at a temperature of 0 to 50° C., preferably from 10 to 45° C., and more preferably from 15 to 40° C.

The pressure in the prepolymerisation reactor is not critical but must be sufficiently high to maintain the reaction mixture in liquid phase. Thus, the pressure may be from 20 to 100 bar, for example 30 to 70 bar.

The catalyst components are preferably all introduced to the prepolymerisation step. However, where the solid catalyst component (i) and the cocatalyst (ii) can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60 wt % monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 m/sec.

The particularly preferred embodiment of the invention comprises carrying out the polymerization in a process comprising either a combination of one loop and one or two gas phase reactors or a combination of two loops and one or two gas phase reactors.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315 incorporated herein by reference.

A further suitable slurry-gas phase process is the Spheripol® process of Basell.

Preferably the heterophasic propylene copolymers with improved purity according to the invention are produced by using a special Ziegler-Natta procatalyst in combination with a special external donor, as described below in detail, in the Spheripol® or in the Borstar®PP process.

One preferred multistage process may therefore comprise the steps of:
producing a polypropylene polymer matrix (A) in the presence of the chosen catalyst system, as described in detail below, comprising the special Ziegler-Natta procatalyst (i), an external donor (iii) and optionally the cocatalyst (ii) in a first slurry reactor and optionally in a second slurry reactor, both slurry reactors using the same polymerisation conditions, transferring the slurry reactor product into a 1st GPR producing an ethylene/propylene-copolymer in the polymer matrix in the presence of the catalyst system in said 1st GPR optionally transferring the 1st GPR product into a 2nd GPR and producing a second ethylene/propylene-copolymer in the polymer matrix in the presence of the catalyst system in said 2nd GPR, said 1st and 2nd ethylene/propylene mixtures may have the same or different composition ratios and recovering the polymer product for further processing.

One skilled in the art is aware of the various possibilities to produce heterophasic propylene copolymers and will simply find out a suitable procedure to produce suitable polymers which are used in the present invention.

With respect to the above-mentioned preferred slurry-gas phase process, the following general information can be provided with respect to the process conditions.

Temperature of from 40° C. to 110° C., preferably between 50° C. and 100° C., in particular between 60° C. and 90° C., with a pressure in the range of from 20 to 80 bar, preferably 30 to 60 bar, with the option of adding hydrogen in order to control the molecular weight in a manner known per se.

The reaction product of the slurry polymerization, which preferably is carried out in a loop reactor, is then transferred to the subsequent gas phase reactor, wherein the temperature preferably is within the range of from 50° C. to 130° C., more preferably 60° C. to 100° C., at a pressure in the range of from 5 to 50 bar, preferably 8 to 35 bar, again with the option of adding hydrogen in order to control the molecular weight in a manner known per se.

The residence time can vary in the reactor zones identified above. In one embodiment, the residence time in the slurry reactor, for example a loop reactor, is in the range of from 0.5 to hours, for example 0.5 to 2 hours, while the residence time in the gas phase reactor generally will be from 1 to 8 hours.

If desired, the polymerization may be effected in a known manner under supercritical conditions in the slurry, preferably loop reactor, and/or as a condensed mode in the gas phase reactor.

According to the invention the high purity heterophasic propylene copolymers are obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

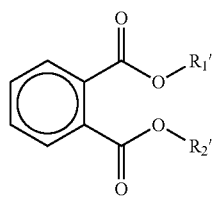

(I)

wherein $R_1'$ and $R_2'$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$ The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanised carrier, followed by the steps of adding to said titanised carrier (i) a dialkylphthalate of formula (I) with $R_1'$ and $R_2'$ being independently at least a $C_5$-alkyl, like at least a $C_8$-alkyl, or preferably (ii) a dialkylphthalate of formula (I) with $R_1'$ and $R_2'$ being the same and being at least a $C_5$-alkyl, like at least a $C_8$-alkyl or more preferably (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product subjecting said first product to suitable transesterification conditions, i.e. to a temperature between 100 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

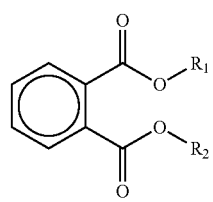

(II)

with $R_1$ and $R_2$ being methyl or ethyl, preferably ethyl, the dialkylphthalat of formula (II) being the internal donor and recovering said transesterification product as the procatalyst composition.

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

The transesterification is performed at a temperature above 100° C., advantageously between 130 to 150° C.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5% by weight of titanium at the most, preferably 2.2% by weight at the most and more preferably 2.0% by weight at the most. Its donor content is preferably between 4 to 12% by weight and more preferably between 6 and 10% by weight.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BC-1 catalyst of Borealis (prepared according to WO92/19653 as disclosed in WO 99/24479; especially with the use of dioctylphthalate as dialkylphthalate of formula (I) according to WO 92/19658) or the catalyst Polytrack 8502, commercially available from Grace.

In a further embodiment, the Ziegler-Natta procatalyst can be modified by polymerising a vinyl compound in the presence of the catalyst system, comprising the special Ziegler-Natta procatalyst, an external donor and optionally a cocatalyst, which vinyl compound has the formula:

$$CH_2=CH-CHR_6R_7$$

wherein $R_6$ and $R_7$ together form a 5- or 6-membered saturated, unsaturated or aromatic ring or independently represent an alkyl group comprising 1 to 4 carbon atoms, and the modified catalyst is used for the preparation of the polymer composition. The polymerised vinyl compound can act as a nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

For the production of the high purity heterophasic propylene copolymers according to the invention the catalyst system used preferably comprises in addition to the special Ziegler-Natta procatalyst an organometallic cocatalyst as component (ii). Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (I)

$$Si(OCH_2CH_3)_3(NR^1R^2)$$

wherein $R^1$ and $R^2$ can be the same or different a represent a hydrocarbon group having 1 to 12 carbon atoms.

$R^1$ and $R^2$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^1$ and $R^2$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. More preferably both $R^1$ and $R^2$ are the same, yet more preferably both $R^1$ and $R^2$ are an ethyl group.

Most preferably diethylaminotriethoxysilane is used as external donor.

The external donor may be produced according to the methods disclosed in EP 1538 167. The content of this document is herein included by reference.

The invention therefore also is related to a new catalyst system comprising
(i) a Ziegler-Natta procatalyst which contains a trans-esterification product of a lower alcohol and a phthalic ester and
(ii) optionally an organometallic cocatalyst and
(iii) an external donor represented by formula (I)

$$Si(OCH_2CH_3)_3(NR^1R^2)$$

wherein $R^1$ and $R^2$ can be the same or different a represent a hydrocarbon group having 1 to 12 carbon atoms, and the use of it for the production of high purity heterophasic polypropylene copolymers.

Furthermore, the current invention also provides a multistage process for producing heterophasic propylene copolymers using the special catalyst system comprising components (i), (ii) and (iii).

The copolymers of the invention may further contain various conventional additives, such as miscible thermoplastics, antioxidants, UV-stabilizers, acid scavengers, lubricants, demoulding agents, nucleating agents, fillers, colouring agents, etc. in an amount of 0.001 to 10 wt. %, preferably up to 5.0 wt % and more preferably up to 3.0 wt % based on the weight of the heterophasic propylene copolymer.

Moulding resin formulations comprising the heterophasic propylene copolymers produced according to the invention may further comprise 0.3 to 40 wt % of one or more particulate of fibrous reinforcing fillers such as glass fiber or carbon fiber, graphite, carbon black or the like, or fillers such as clay, talc and mineral fillers and the like commonly employed in the trade for the manufacture of molded articles and extruded goods.

In the preferred embodiments, the additives are added to the heterophasic propylene copolymer, which is collected from the final reactor of the series of reactors. Preferably, these additives are mixed into the composition prior to or during the extrusion process in a one-step compounding process. Alternatively, a master batch may be formulated, wherein the heterophasic propylene copolymer is first mixed with only some of the additives.

For mixing, a conventional compounding or blending apparatus, e.g. a Banbury mixer, a 2-roll rubber mill, Bussco-kneader or a twin screw extruder may be used. The polymer materials recovered from the extruder are usually in the form of pellets. These pellets are then preferably further processed, e.g. by injection moulding to generate articles and products of the inventive heterophasic propylene copolymers.

Heterophasic propylene copolymers according to the invention may be pelletized and compounded using any of the variety of compounding and blending methods well known and commonly used in the resin compounding art.

The compositions of the current invention are preferably used for the production of moulded articles, preferably injection moulded articles. Even more preferred is the use for the production of thin wall packaging articles, household electrical materials and automotive applications, especially of car interiors and exteriors, in particular car interiors as for example dashboards, door claddings, consoles, trims and the like and for food and medical packaging.

The current invention also provides articles comprising the inventive high purity heterophasic propylene copolymers. Preferably, these articles are produced by injection moulding.

Surprisingly, it was found that the moulded articles manufactured with the heterophasic propylene copolymer resins prepared according to the invention display improved purity.

It will be shown in the example section below that the polymer compositions according to the invention show lower amount of volatiles, fogging, emission and hexane-solubles compared to other polymer compositions known from the state of the art. At the same time good impact properties such as Charpy notched impact strength, especially at low temperatures are achieved whereas the flexural and tensile properties in behalf of flexural and tensile modulus are not affected.

The invention may also be characterized as a method for improving purity of heterophasic propylene copolymer resin articles, the method comprising providing an article moulded from a heterophasic propylene copolymer resin, produced in the presence of the above described special catalyst system comprising components (i), (ii) and (iii).

In the following the present invention is further illustrated by means of examples.

Methods:

a) Melt Flow Rate

Unless otherwise specified, the melt flow rate was measured as the $MFR_2$ in accordance with ISO 1133 (230° C., 2.16 kg load) for polypropylene and is indicated in g/10 min. The MFR is an indication of the flowability, and hence the processability, of the polymer. The higher the melt flow rate, the lower the viscosity of the polymer.

b) Comonomer content was measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —$CH_2$-absorption peak (800-650 $cm^{-1}$) was measured with Perkin Elmer FTIR 1600 spectrometer. The method was calibrated by ethylene content data measured by $^{13}$C-NMR.

c) Flexural modulus was measured according to ISO 178 by using injection molded test specimens as described in EN ISO 1873-2 (80×10×4 mm)

d) Tensile Modulus

The tensile modulus was measured according to ISO 572-3 at 1 mm/min and 23° C. Test specimens as described in EN ISO 1873-2 (80×10×4 mm) were used.

e) Xylene Solubles

The xylene soluble fraction (XS) as defined and described in the present invention was determined as follows: 2.0 g of the polymer were dissolved in 250 mm p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 mm flasks. The solution from the first 100 mm vessel was evaporated in nitrogen flow and the residue dried under vacuum at 90° C. until constant weight is reached. The xylene soluble fraction (percent) can then be determined as follows:

$$XS\% = (100 \times m_1 \times v_0)/(m_0 \times v_1),$$

wherein $m_0$ designates the initial polymer amount (grams), $m_1$ defines the weight of residue (grams), $v_0$ defines the initial volume (milliliter) and $v_1$ defines the volume of the analysed sample (milliliter).

f) Intrinsic Viscosity (Iv)

The intrinsic viscosity (IV) value increases with the molecular weight of a polymer. The IV values e.g. of the amorphous phase were measured according to ISO 1628/1 (October 1999) in Decalin at 135° C.

g) Charpy Notches Impact Strength (NIS),

NIS was determined according to ISO 179-1eA:2000 on V-notched samples of 80×10×4 $mm^3$ at 23° C. (Charpy notched impact strength (23° C.)), and −20° C. (Charpy notched impact strength (−20° C.)). The test specimens were prepared by injection moulding using a IM V 60 TECH machinery in line with ISO 1872-2. The melt temperature was 200° C. and the mold temperature was 40° C.

h) Instrumented Falling Weight Impact (IFWI)

IFWI was determined according to ISO 6603-2 with a velocity of 4.4 m/s on 60×60×2 $mm^3$ plates, prepared by injection moulding, at +23° C., 0° C. and −20° C.

Equipment: Hydropuls VHS Co. SCHENK i) Total Emissions of Volatiles

The total emission of the polymers was determined by using multiple head space extraction according to VDA 277: 1995 using a gas chromatograph and a headspace method. The equipment was a Hewlett Packard gas chromatograph with a WCOT-capillary column (wax type) of 30 m length and 0.25 mm×2.5 μm inner diameter (0.25 μm film thickness). A flame ionisation detector was used with hydrogen as a fuel gas.

The GC settings were as follows: 3 minutes isothermal at 50° C., heat up to 200° C. at 12 K/min, 4 minutes isothermal at 200° C., injection-temperature: 200° C., detection-temperature: 250° C., carrier helium, flow-mode split 1:20 and average carrier-speed 22-27 cm/s.

The emission potential was measured on the basis of the sum of all values provided by the emitted substances after gas chromatography analysis and flame ionization detection with acetone as the calibration standard. Sample introduction (pellets, about 1 gram) was by headspace analysis (10 ml head space vial) after conditioning at 120° C. for 5 hours prior to the measurement.

The unit is μgC/g (μg carbon per g of sample).

j) VOC/FOG Emission

The VOC/FOG emission was measured according to VDA 278:2002 on the granulated compounds. The volatile organic compounds are measured in toluene equivalents per gram sample (μgTE/g). The fogging is measured in hexadecane equivalents per gram sample (μgHD/g).

The measurements were carried out with a TDSA supplied by Gerstel using helium 5.0 as carrier gas and a column HP Ultra 2 of 50 m length and 0.32 mm diameter and 0.52 μm coating of 5% Phenyl-Methyl-Siloxane.

The VOC-Analysis was done according to device setting 1 listed in the standard using following main parameters: flow mode splitless, final temperature 90° C.; final time 30 min, rate 60K/min. The cooling trap was purged with a flow-mode split 1:30 in a temperature range from −150° C. to +280° C. with a heating rate of 12 K/sec and a final time of 5 min. The following GC settings were used for analysis: 2 min isothermal at 40° C. heating at 3 K/min up to 92° C., then at 5 K/min up to 160° C., and then at 10 K/min up to 280° C., 10 minutes isothermal; flow 1.3 ml/min.

The VOC amounts account for $C_{10}$ to $C_{16}$ species.

The FOG analysis was done according to device setting 1 listed in the standard using following main parameters: flow-mode splitless, rate 60K/min; final temperature 120° C.; final time 60 min. The cooling trap was purged with a flow-mode split 1:30 in a temperature range from −150° C. to +280° C. with a heating rate of 12 K/sec. The following GC-settings were used for analysis: isothermal at 50° C. for 2 min, heating at 25 K/min up to 160° C., then at 10 K/min up to 280° C., 30 minutes isothermal; flow 1.3 ml/min.

The FOG amounts account for $C_{16}$ to $C_{30}$ species.

k) Hexane-Solubles (Wt %)

The content of hexane-solubles was determined according to FDA CFR 21 §177.1520. Procedure: 1 g sample of a polymer film of 100 μm thickness (produced on a PM30 cast film line using chill-roll temperature of 40° C.) was extracted at 50° C. in 400 ml n-hexane for 2 hours and then filtered on a filter paper N° 41. The filtrate was then evaporated and the total residue weighed as a measure of the n-hexane extractable fraction.

l) Fogging (mg)

Fogging has been determined according to DIN75201, Part B on 2 mm thick compression molded plaques. Thermal treatment was performed at 100° C. for 16 hours. Fogging is expressed as a difference in weight before and after treatment.

EXAMPLES 1-3

Inventive

The Base resins were produced in a plant having a prepolymerization reactor, a loop reactor and one fluid bed gas-reactor connected in series. The catalyst used in the polymerization was prepared according to WO 92/19653 with DOP as dialkylphthalat of the formula (I) and ethanol as alcohol, the cocatalyst was Triethylaluminium (TEA) and as an external donor diethylamino triethoxy silane was used.

After a first pre-polymerisation step the catalyst system was fed to the slurry reactor, where the polymerisation of the polypropylene homopolymer matrix phase was performed. The slurry phase loop reactor was then followed by a gas phase reactor in series, in which the elastomeric rubber disperse phase was produced by copolymerisation of propylene with ethylene comonomer.

The Base resins 1-3 contained a unimodal matrix and a unimodal rubber.

Reaction Conditions:

|  | EXAMPLE 1 | EXAMPLE 2 | EXAMPLE 3 |
|---|---|---|---|
| 1) Prepolymerization | | | |
| T [° C.] | 20 | 20 | 20 |
| TEA/D [g/g] | 3 | 3 | 3 |
| TEA/$C_3$ [g/kg] | 0.2 | 0.2 | 0.2 |
| 2) Loop-reactor | | | |
| T [° C.] | 65 | 65 | 65 |
| Pressure [bar] | 34 | 34 | 34 |
| $MFR_2$ [g/10 min] | 63 | 90 | 163 |
| $H_2/C_3$ [ppm] | 4200 | 5100 | 6740 |
| XS [wt %] | 1.6 | 2.4 | 2.0 |
| 3) Gas phase reactor | | | |
| T [° C.] | 80 | 80 | 80 |
| Pressure [bar] | 10 | 11 | 12 |
| $C_2$ [wt %] | 3.3 | 7.1 | 5.6 |
| $C_3$/EPR [wt %] | 62.5 | 58 | 58 |
| IV/X total [dl/g] | 1.76 | 2.27 | 2.2 |
| $MFR_2$ [g/10 min] | 50 | 44 | 97 |
| XS [wt %] | 9.4 | 15.0 | 13.2 |
| Split loop:GPR [%] | 90:10 | 85:15 | 86.5:13.5 |

EXAMPLES 4 and 5

Comparative

The Comparative resins 4 and 5 were produced in a plant having a prepolymerization reactor, one loop reactor and one gas phase reactor connected in series as described for Base resins 1-3. The catalyst used in the polymerization was the same as for Examples 1-3, the cocatalyst was Triethylaluminium (TEA) and as an external donor dicyclopentyl dimethoxy silane was used.

Reaction Conditions:

|  | EXAMPLE 4 | EXAMPLE 5 |
|---|---|---|
| 1) Prepolymerization | | |
| T [° C.] | 20 | 20 |
| TEA/D [g/g] | 3 | 10* |
| TEA/$C_3$ [g/kg] | 0.2 | 0.2 |
| 2) Loop-reactor | | |
| T [° C.] | 65 | 62** |
| Pressure [bar] | 34 | 34 |
| $MFR_2$ [g/10 min] | 54 | 151 |
| $H_2/C_3$ [ppm] | 7270 | 11570 |
| XS [wt %] | 1.5 | 2.9 |
| 3) Gas phase reactor | | |
| T [° C.] | 80 | 80 |
| Pressure [bar] | 12 | 12 |
| $C_2$ [wt %] | 4.5 | 3.9 |
| $C_3$/EPR [wt %] | 64 | 60 |
| IV/X total [dl/g] | 1.76 | 2.05 |
| $MFR_2$ [g/10 min] | 46 | 95 |
| XS [wt %] | 9.6 | 10.9 |
| Split loop:GPR [%] | 89:11 | 80.5:19.5 |

*a ratio of 10 instead of 3 was used to allow use of high amounts of H2
**62° C. instead of 65° C. were used to allow use of high amounts of H2

EXAMPLES 6-8

Comparative

The Comparative resins 6-8 were produced in a plant having a prepolymerization reactor, one loop reactor and one gas phase reactor connected in series as described for Base resins 1-3. The catalyst used in the polymerization was the ZN118 catalyst commercially available from Basell, the cocatalyst was Triethylaluminium (TEA) and as an external donor dicyclopentyl dimethoxy silane was used.

Reaction Conditions:

|  | EXAMPLE 6 | EXAMPLE 7 | EXAMPLE 8 |
|---|---|---|---|
| 1) Prepolymerization |  |  |  |
| T [° C.] | 20 | 20 | 20 |
| TEA/D [g/g] | 3 | 3 | 3 |
| TEA/C$_3$ [g/kg] | 0.2 | 0.2 | 0.2 |
| 2) Loop-reactor |  |  |  |
| T [° C.] | 65 | 62*** | 62*** |
| Pressure [bar] | 34 | 34 | 34 |
| MFR$_2$ [g/10 min] | 56 | 92 | 164 |
| H$_2$/C$_3$ [ppm] | 5900 | 7600 | 10300 |
| XS [wt %] | 2.5 | 2.6 | 3.8 |
| 3) Gas phase reactor |  |  |  |
| T [° C.] | 80 | 80 | 80 |
| Pressure [bar] | 10.2 | 10 | 11.4 |
| C$_2$ [wt %] | 3.0 | 6.8 | 4.8 |
| C$_3$/EPR [wt %] | 60.7 | 57.6 | 57.5 |
| IV/X total [dl/g] | 1.80 | 2.16 | 2.21 |
| MFR$_2$ [g/10 min] | 43 | 45 | 85 |
| XS [wt %] | 9.2 | 16.8 | 14.4 |
| Split loop:GPR [%] | 90:10 | 81.5:18.5 | 84:16 |

***62° C. instead of 65° C. were used to allow use of high amounts of H2

Testing of Base and Comparative Resins

Base resins 1-8 were initially obtained in powder form.

Base resins 1, 4 and 6 were mixed with 0.1 [wt %] talc A3 (from Luzenac (Naintsch)), 0.2 [wt %] SHT (synthetic hydrotalcite; DHT-4A from Kyowa), 0.15 [wt %] Irganox1010 (Ciba Speciality Chemicals, antioxidant), 0.1 [wt %] Irgafos 168 (Ciba Speciality Chemicals, stabilizer), 0.15 [wt %] OSA (oleamide (9-octadecenamide) from Croda Chemical, slip agent) and 0.08 [wt %] sodiumbenzoate.

Base resins 2 and 7 were mixed with 0.5 [wt %] talc A3 (from Luzenac (Naintsch)), 0.05 [wt %] calciumstearate and 0.1 [wt %] Irganox B215 (Ciba Speciality Chemicals, antioxidant).

Base resins 3, 5 and 8 were mixed with 0.7 [wt %] talc A3 (from Luzenac (Naintsch)), 0.2 [wt %] SHT (synthetic hydrotalcite; DHT-4A from Kyowa), 0.1 [wt %] sodiumbenzoate and 0.1 [wt %] Irganox B215 (Ciba Speciality Chemicals, antioxidant).

The mixtures were compounded by feeding the components to a Prism 24twin-screw extruder (Prism Ltd., Staffordshire, UK). The material was then extruded through a strand die, cooled and chopped to form pellets.

TABLE 2

Properties of compounded resins 1-8

| Base resin | 1 | 4 | 6 | 2 | 7 | 3 | 5 | 8 |
|---|---|---|---|---|---|---|---|---|
| MFR 230° C./2.16 kg [g/10'] | 39 | 34 | 32 | 43 | 40 | 93 | 86 | 89 |
| XCS [wt %] | 9.1 | 9.1 | 9.3 | 13.4 | 15.9 | 10.8 | 8.9 | 11.4 |
| C$_3$(XCS) [wt %] | 66.1 | 71 | 70.5 | 66 | 66 | 69.1 | 68.6 | 68.3 |
| C$_2$-total | 3.3 | 4.5 | 3.3 | 7.1 | 6.8 | 5.6 | 3.9 | 4.8 |
| Tensile Modulus [MPa] | 1835 | 1875 | 1835 | 1475 | 1424 | 1776 | 1870 | 1746 |
| Flexural Modulus [MPa] | 1743 | 1806 | 1746 | 1384 | 1330 | 1690 | 1791 | 1664 |
| Impact - Charpy NIS(23° C.) [kJ/m$^2$] | 3.8 | 4.1 | 4.2 | 6.2 | 6.4 | 3.3 | 2.8 | 3.0 |
| Impact - Charpy NIS(0° C.) [kJ/m$^2$] | 1.9 | 2.3 | 2.2 | 3.8 | 4.6 | 2.0 | 1.8 | 2.0 |
| Impact - Charpy NIS(−20° C.) [kJ/m$^2$] | 1.4 | 2.1 | 2.0 | 2.8 | 3.2 | 1.8 | 1.4 | 1.8 |
| IFWI: Force max (23° C.) [N] | 2421 | 2425 | 2276 | 2163 | 2103 | 2096 | 1713 | 1612 |
| Energy tot (23° C.) [J] | 16.1 | 14.7 | 11.3 | 20.6 | 23.8 | 10.1 | 5.8 | 5.6 |
| Force max (−20° C.) [N] | 644 | 1770 | 1612 | 2720 | 2758 | 1308 | 743 | 1329 |
| Energy tot (−20° C.) [J] | 0.8 | 4.7 | 3.8 | 12.3 | 5.0 | 2.8 | 1.0 | 3.0 |
| Emissions [μgC/g] | 42 | 48 | 38 | 48 | 46 | 56 | 56 | 48 |
| Fogging [mg] | 2.59 | 3.16 | 2.64 | 1.9 | 2.58 | 3.6 | 4.1 | 4.2 |
| VOC [μgTE/g] | na | na | na | 336 | 409 | 408 | 584 | 454 |
| FOG [μgHD/g] | na | na | na | 900 | 1024 | 1145 | 1490 | 1510 |
| Hexane-solubles [wt %] | 2.0 | 1.9 | 2.2 | 3.1 | 4.0 | 3.0 | 3.1 | 3.6 |

We claim:

1. Process for producing high purity heterophasic polypropylene copolymers comprising
  (A) 73 to 98 wt. % of a propylene homo- or copolymer matrix with an $MFR_2$ in accordance with ISO 1133 (230° C., 2.16 kg load) of 45 to 500 g/10 min; wherein for the propylene copolymer matrix, the comonomer is ethylene and/or one other $C_4$ to $C_{10}$ alpha-olefin and the comonomer content is 7.0 to 10.0 wt. % of component (A); and
  (B) 2 to 27 wt. % of elastomeric copolymers, comprising propylene in an amount of at least 50 wt. % of component (B) and ethylene and/or one other $C_4$ to $C_{10}$ alpha olefin in an amount of 20 to less than 50 wt. % of component (B),
  wherein said high purity heterophasic polypropylene copolymers have the following properties: the amount of volatile organic compounds (VOC) is 336 to 408 µgTE/g; the tensile modulus is 1475 to 1835 MPa; and, the flexural modulus is 1384 to 1743 MPa;
  said process comprises the steps of:
    providing a catalyst system
    producing a polypropylene polymer matrix (A) using said catalyst system, wherein said catalyst system comprises a Ziegler-Natta procatalyst (I) which contains a trans-esterification product of lower alcohol having at least $C_5$ alkyl and phthalic ester, an external donor (III) represented by formula (I) $Si(OCH_2CH_3)_3(NR^1R^2)$ wherein $R^1$ and $R^2$ can be the same or different and represent a hydrocarbon group having 1 to 12 carbon atoms, and an organometallic cocatalyst (ii) in a first slurry reactor and in a second slurry reactor, both slurry reactors using the same polymerization conditions,
    transferring the slurry reactor product into a $1^{st}$ GPR
    producing an elastomeric copolymer (B) of propylene and ethylene and/or one other $C_4$ to $C_{10}$ alpha olefin in the polymer matrix in the presence of the catalyst system in said $1^{st}$ GPR
    transferring the $1^{st}$ GPR product into a $2^{nd}$ GPR and producing a second elastomeric copolymer (B) of propylene and ethylene and/or one other $C_4$ to $C_{10}$ alpha olefin in the polymer matrix in the presence of the catalyst system in said $2^{nd}$ GPR, said $1^{st}$ and $2^{nd}$ copolymers of propylene and ethylene and/or one other $C_4$ to $C_{10}$ alpha olefin may have the same or different composition ratios and
    recovering the polymer product for further processing.

2. Process according to claim 1, wherein the propylene matrix (A) of the heterophasic polypropylene copolymers is a propylene homopolymer.

3. Process according to claim 1, wherein the elastomeric copolymer (B) is unimodal.

4. Process according to claim 1, wherein the elastomeric copolymer (B) comprises propylene and ethylene as the only polymerizable units.

5. High purity hetorophasic polypropylene copolymers having an $MFR_2$ in accordance with ISO 1133 (230° C., 2.16 kg load) of above 35 g/10 min, said copolymers comprise
  (A) 73 to 98 wt. % of a propylene homo- or copolymer matrix with an $MFR_2$ in accordance with ISO 1133 (230° C., 2.16 kg load) of 45 to 500 g/10 min; wherein for the propylene copolymer matrix, the comonomer is ethylene and/or one other $C_4$ to $C_{10}$ alpha-olefin and the comonomer content is 7.0 to 10.0 wt. % of component (A); and
  (B) 2 to 27 wt. % of an elastomeric copolymer, comprising propylene in an amount of at least 50 wt. % of component (B) and ethylene and/or one other $C_4$ to $C_{10}$ alpha olefin in an amount of 20 to less than 50 wt. % of component (B),
  wherein said high purity heterophasic polypropylene copolymers have the following properties: the amount of volatile organic compounds (VOC) is 336 to 408 µgTE/g; the tensile modulus is 1475 to 1835 MPa: and, the flexural modulus is 1384 to 1743 MPa;
  the heterophasic polypropylene copolymers being obtained by a multistage polymerzation procees in the presence of a catalyst system comprising
  (i)a Ziegler-Natta procatalyst which contains a trans-esterification product of a lower alcohol having at least $C_5$ alkyl and a phthalic ester and
  (ii) an organometallic cocatalyst and
  (iii)an external donor represented by formula (I)

$Si(OCH_2CH_3)_3(NR^1R^2)$ wherein $R^1$ and $R^2$ can be the same or different and represent a hydrocarbon group having 1 to 12 carbon atoms.

6. High purity heterophasic polypropylene copolymers according to claim 5, wherein the propylene matrix (A) of said heterophasic polypropylene copolymers is a propylene homopolymer.

7. The high purity heterophasic polypropylene copolymers according to claim 5 used in the manufacture of moulded articles and injection molded articles.

8. A process for producing high purity heterophasic polypropylene copolymers comprising
  (A) 73 to 98 wt. % of a propylene homopolymer matrix with an $MFR_2$ in accordance with ISO 1133 (230° C., 2.16 kg load) of 45 to 500 g/10 min and
  (B) 2 to 27 wt. % of elastomeric copolymers, comprising propylene in an amount of at least 50 wt. % of component (B) and at least ethylene and/or one other C4 to C10 alpha olefin in an amount of 20 to less than 50 wt. % of component (B) in a multistage polymerization process, wherein said high purity heterophasic polypropylene copolymers have the following properties: the amount of volatile organic compounds (VOC) is 336 to 408 µgTE/g; the tensile modulus is 1475 to 1835 MPa; and, the flexural modulus is 1384 to 1743 MPa;
  said process for producing comprising process steps of:
    providing a catalyst system
    producing a polypropylene polymer matrix (A) using said catalyst system, said catalyst system comprising a Ziegler-Natta procatalyst (i) which contains a trans-esterification product of lower alcohol having at least $C_5$ alkyl and a phthalic ester, (ii)an organometallic cocatalyst and an external donor (iii) represented by formula (I) $Si(OCH_2CH_3)_{3(NR}{}^1R^2)$ wherein $R^1$ and $R^2$ can be the same or different and represent a hydrocarbon group having 1 to 12 carbon atoms, and an organometallic cocatalyst (ii) in a first slurry reactor and in a second slurry reactor, both slurry reactors using the same polymerization conditions,
    transferring the slurry reactor product into a $1^{st}$ GPR
    producing an elastomeric copolymer (B) of propylene and a ethylene and/or one other $C_4$ to $C_{10}$ alpha olefin in the polymer matrix in the presence of the catalyst system in said $1^{st}$ GPR
    transferring the $1^{st}$ GPR product into a $2^{nd}$ GPR and producing a second elastomeric copolymer (B) of propylene and one comonomer which is ethylene or one other $C_4$ to $C_{10}$ alpha olefin in the polymer matrix in the presence of the catalyst system in said $2^{nd}$ GPR, said $1^{st}$ and $2^{nd}$ copolymers of propylene and ethylene and/or one other $C_4$ to $C_{10}$ alpha olefin may have the same or different composition ratios and recovering the polymer product for further processing.

9. An article produced from heterophasic polypropylene copolymers, said heterophasic polypropylene copolymers having $MFR_2$ in accordance with ISO 1133 (230° C., 216 kg load) of above 35 g/10 min, said copolymer comprising (A) 73 to 98 wt % of a propylene homo- or copolymer matrix with an $MFR_2$ in accordance with ISO 1133 (230° C., 2.16 kg load) of 45 to 500 g/10 min; wherein for the propylene copolymer matrix, the comonomer is ethylene and/or one other $C_4$ to $C_{10}$ alpha-olefin and the comonomer content is 7.0 to 10.0 wt % of component (A); and (B) 2 to 27 wt % of an elastormeric copolymer, comprising propylene in an amount of at least 50 wt % of component (B) and ethylene and/or one other $C_4$ to $C_{10}$ alpha olefin in an amount of 20 to less than 50 wt % of component (B), wherein said high purity heterophasic polypropylene copolymers have the following properties: the amount of volatile organic compounds (VOC) is 336 to 408 μgTE/g; the tensile modulus is 1475 to 1835 MPa; and, the flexural modulus is 1384 to 1743 MPa;

the heterophasic polypropylene copolymers being obtained by a multistage polymerization process in the presence of a catalyst system comprising (i) Ziegler-Natta procatalyst which contains a trans-esterification product of a lower alcohol having at least $C_5$alkyl and a phthalic ester and (ii) an organometallic cocatalyst and (iii) an external donor represented by formula (I)

$Si(OCH_2CH_3)_3(NR^1R^2)$ wherein $R^1$ and $R^2$ can be the same or different and represent a hydrocarbon group having 1 to 12 carbon atoms.

* * * * *